(12) United States Patent
Losinski et al.

(10) Patent No.: US 8,002,142 B2
(45) Date of Patent: Aug. 23, 2011

(54) AMBIENT PRESSURE-RESPONSIVE VARIABLE VOLUME FUEL TANK

(75) Inventors: Armand Losinski, Albuquerque, NM (US); Matthew Tehan, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 563 days.

(21) Appl. No.: 12/142,586

(22) Filed: Jun. 19, 2008

(65) Prior Publication Data

US 2009/0314783 A1 Dec. 24, 2009

(51) Int. Cl.
*B65D 25/04* (2006.01)
*B65D 1/32* (2006.01)
*B65D 6/12* (2006.01)

(52) U.S. Cl. ......... 220/721; 220/530; 220/720; 220/723
(58) Field of Classification Search .......... 220/530, 220/720, 721, 723; 137/205.5
See application file for complete search history.

(56) References Cited

U.S. PATENT DOCUMENTS

| | | | |
|---|---|---|---|
| 1,690,072 A | 10/1928 | Johnson | |
| 1,853,376 A * | 4/1932 | Powelson et al. | 244/93 |
| 2,653,780 A * | 9/1953 | Pepersack | 244/135 B |
| 2,736,356 A * | 2/1956 | Oates, Jr. et al. | 222/107 |
| 2,758,747 A * | 8/1956 | Stevens | 220/530 |
| 3,693,825 A * | 9/1972 | Richman | 220/227 |
| 4,925,057 A | 5/1990 | Childress et al. | |
| 5,913,451 A * | 6/1999 | Madison | 220/723 |
| 5,979,481 A | 11/1999 | Ayresman | |
| 6,021,978 A | 2/2000 | Goss | |
| 6,260,544 B1 | 7/2001 | Spry et al. | |
| 6,360,729 B1 | 3/2002 | Ellsworth | |
| 6,561,236 B1 | 5/2003 | Sperry et al. | |
| 6,651,702 B2 | 11/2003 | Marino | |
| 6,681,789 B1 | 1/2004 | Moulis et al. | |
| 6,755,219 B1 | 6/2004 | Bolle | |
| 7,011,119 B2 | 3/2006 | Fink, Jr. | |
| 2003/0230356 A1 | 12/2003 | Leveen | |
| 2005/0155669 A1 | 7/2005 | Weder | |
| 2007/0193650 A1 | 8/2007 | Annati | |
| 2009/0090724 A1 * | 4/2009 | Childress et al. | 220/560.01 |

* cited by examiner

*Primary Examiner* — Anthony Stashick
*Assistant Examiner* — Madison L Wright
(74) *Attorney, Agent, or Firm* — Ingrassia Fisher & Lorenz, P.C.

(57) ABSTRACT

An apparatus is provided for a fuel tank system for an air vehicle. The system comprises a container having an interior adapted to hold fuel, the container comprising a first opening placing the interior in fluid communication with the ambient atmosphere, and a volumetrically-adjustable sizing device adapted to change volume in response to changes in surrounding air pressure, the sizing element disposed within the container and adapted to contain a fluid.

20 Claims, 3 Drawing Sheets

AMBIENT PRESSURE-RESPONSIVE VARIABLE VOLUME FUEL TANK

STATEMENT REGARDING FEDERALLY SPONSORED RESEARCH OR DEVELOPMENT

This invention was made with Government support under contract number W56HZV-05-C-0724 awarded by the United States Army. The Government has certain rights in the invention.

TECHNICAL FIELD

Embodiments of the subject matter described herein relate generally to fuel tanks for air vehicles. More particularly, embodiments of the subject matter relate to variable-volumetric fuel tanks for air vehicles.

BACKGROUND

Some air vehicles, such as unmanned air vehicles (UAVs) commonly operate with internal combustion engines. Consequently, when operating from higher elevations, the engine can suffer from reduced performance during flight due to the lesser available oxygen in the lower-density air in the surrounding environment, even when only attaining lower altitudes. Some UAVs are being adapted to operate with turbine engines to alleviate the performance problem of operation at higher elevations. Additionally, turbine engines provide other preferable performance characteristics, such as an increased thrust and durability.

Turbine engines, however, require more fuel when operating from lower elevations than at higher elevations. Because performance is directly related to the weight of the UAV and fuel is one of the largest contributors to the overall weight of the UAV, it is advantageous to manage the fuel aboard a UAV as precisely as possible. Some techniques of adjusting the fuel within a UAV's fuel tank include the use of metered fuel containers, graduated syringe fueling, fuel level sensors, and determination of fuel requirements in the field using air density/altitude lookup tables.

As different models and configurations of UAVs can have different performance characteristics, it can be difficult to compensate for altitude among various types of UAVs. Accordingly, because of the combination of different types of UAVs and varying elevations of operation, it can be problematic to optimize fueling of a UAV for a specific mission profile at a given elevation.

BRIEF SUMMARY

An apparatus is provided for a fuel tank system for an air vehicle. The system comprises a container having an interior adapted to hold fuel, the container comprising a first opening placing the interior in fluid communication with the ambient atmosphere, and a volumetrically-adjustable sizing device adapted to change volume in response to changes in surrounding air pressure, the sizing element disposed within the container and adapted to contain a fluid.

A method for adjusting an available volume of an interior of the fuel tank of an unmanned air vehicle is provided. The method comprises inserting an airtight, flexible bladder within the interior and equalizing the air pressure surrounding the flexible bladder with the ambient atmosphere.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
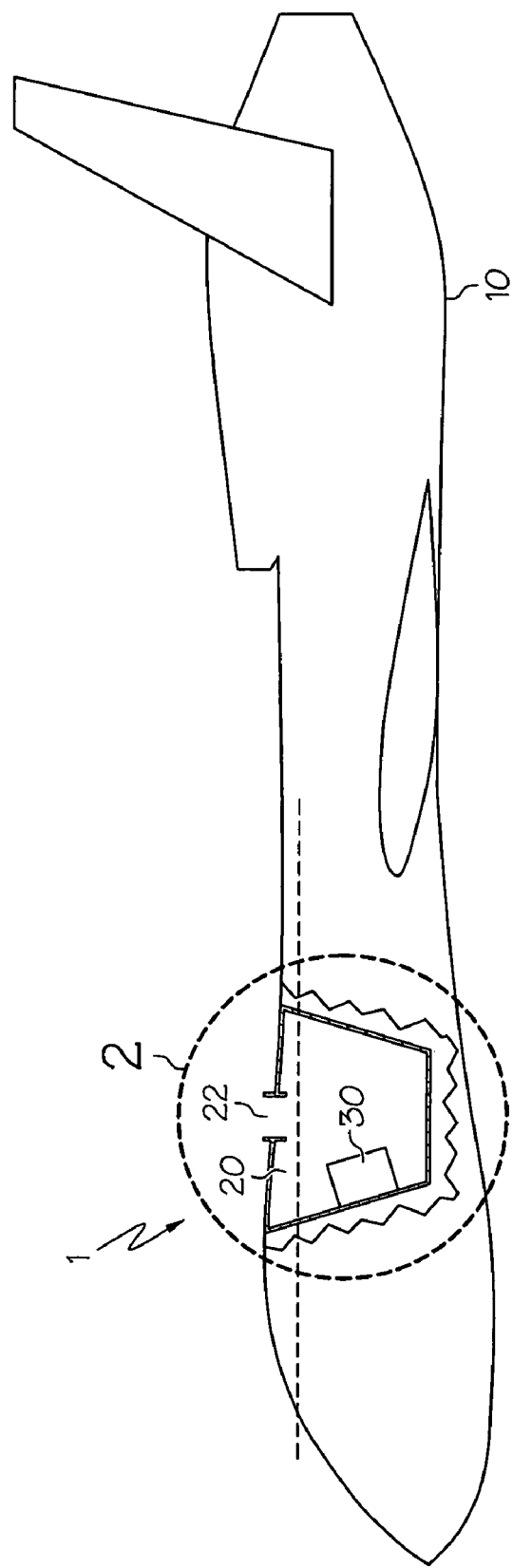
FIG. 1 is a schematic side view of an embodiment of a UAV showing the fuel tank.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Connected/Coupled"—The following description refers to elements or features being "connected" or "coupled" together. As used herein, unless expressly stated otherwise, "connected" means that one element/node/feature is directly joined to (or directly communicates with) another element/node/feature, and not necessarily mechanically, although a mechanical joining can be used if appropriate. Likewise, unless expressly stated otherwise, "coupled" means that one element/feature is directly or indirectly joined to (or directly or indirectly communicates with) another element/feature, including by exerting mutual influence therebetween. That is, movement by a first element/feature can cause movement in the second element/feature as a consequence of their coupling. Such movement can be rotational or it can be a translation. Thus, although the diagrams shown in FIGS. 1-5 depicts exemplary arrangements of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

FIG. 1 illustrates the side view of an aircraft 1 with some portion of the aircraft cut away to show detail beneath. The illustrated aircraft 1 is a UAV, though manned air vehicles can also embody the system and at least some of the features described below. Moreover, other air vehicles, including inflatable vehicles, can be used. Additionally, some techniques and methods described herein can be applicable to other fuel tanks, including those disposed in vehicles, such as automobiles and watercraft, tools, such as lawnmowers or tractors, or other fuel tanks supplying turbine or fuel combustion engines.

The aircraft 1 can comprise various components, systems, elements, and features, including without limitation, avionics, control systems and surfaces, and propulsion elements contained within a fuselage 10. A variable-volume element can be disposed within the fuel tank 20 of the aircraft 1. Preferably, the variable-volume element can be adapted to contain an inert gas, and adjust the volume of the fuel tank 20 available to contain fuel in response to changes in the ambient atmospheric pressure. Specifically, in some embodiments, the ambient atmospheric pressure can adjust the volume of the variable-volume element, which can increase or decrease the volume of the fuel tank which can be occupied by fuel. In certain embodiments, precise sizing and pressurizing of the internal space of the variable-volume element can result in precise fuel tank volume at predetermined elevations prior to fueling. Accordingly, without complicated procedures or specialized equipment, a desired amount of fuel can be provided to an air vehicle that accurately optimizes operation of the aircraft at different elevations within a specified performance profile.

At least one feature of the embodied aircraft 1 can be a fuel tank 20, though multiple fuel tanks can be present. The fuel tank 20 is preferably adapted to contain a suitable volume of fuel to sustain desired operation of the aircraft. Some fuel tanks 20 can couple with other elements of the aircraft, such as one or more engines, as well as other fuel tanks, if present. The engines can be turbine, as well as ramjet- or scramjet-type engines, or any other engine type suitable for the embodiment. Preferably, the fuel tank 20 can comprise or couple with one or more conduits supplying and receiving fuel among the various components, as advantageous to operation.

The fuel tank 20 can also be accessed from outside the aircraft 1 as well, through a fuel port 22. Preferably, the fuel port 22 can be selectively closed and/or sealed, as well as opened, allowing a user or operator, such as fueling technician, to provide or remove fuel and other objects, if desired, to and from the fuel tank 20.

The fuel tank 20 preferably has an interior, and a variable-volume element disposed therewithin. The variable-volume element preferably has an adjustable size and/or shape, permitting the volume it occupies to be altered through external forces. The element can be semi- or partially rigid, as desired, but preferably can have the volume of space it occupies expanded or reduced, as appropriate to the use and/or embodiment. Accordingly, the variable-volume element can be referred to by other suitable terms, including a volumetrically-adjustable sizing element or device, as one non-limiting example. The variable-volume element can be disposed in the tank 20 during manufacture or introduced into fuel tank 20 after manufacture. Additionally, coupling of the sizing element to the interior of the tank 20 as later described can be accomplished during or after manufacture.

Figure 2:
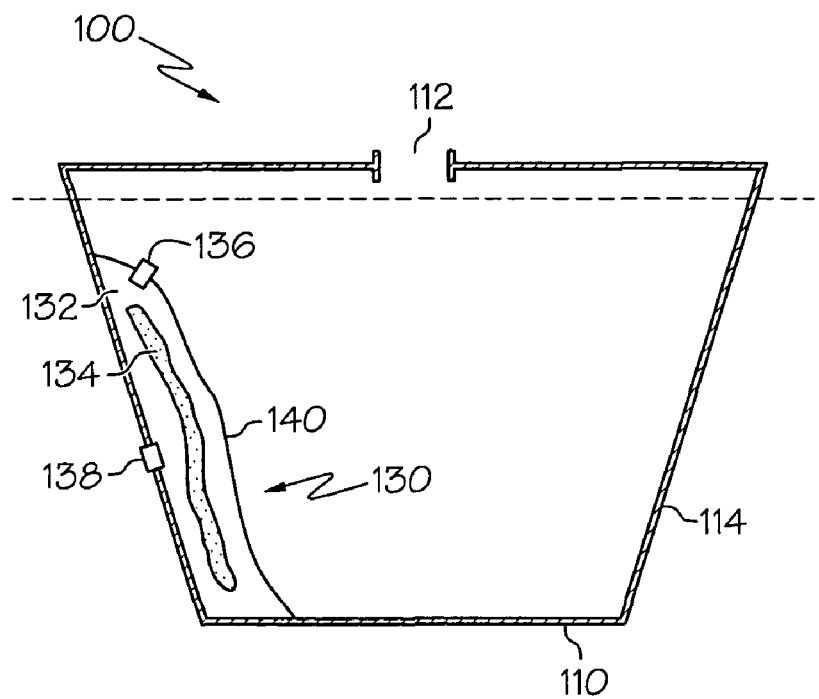
FIG. 2 is a detailed cross-sectional view of the embodiment of the fuel tank of FIG. 1 in a first state.
Figure 3:
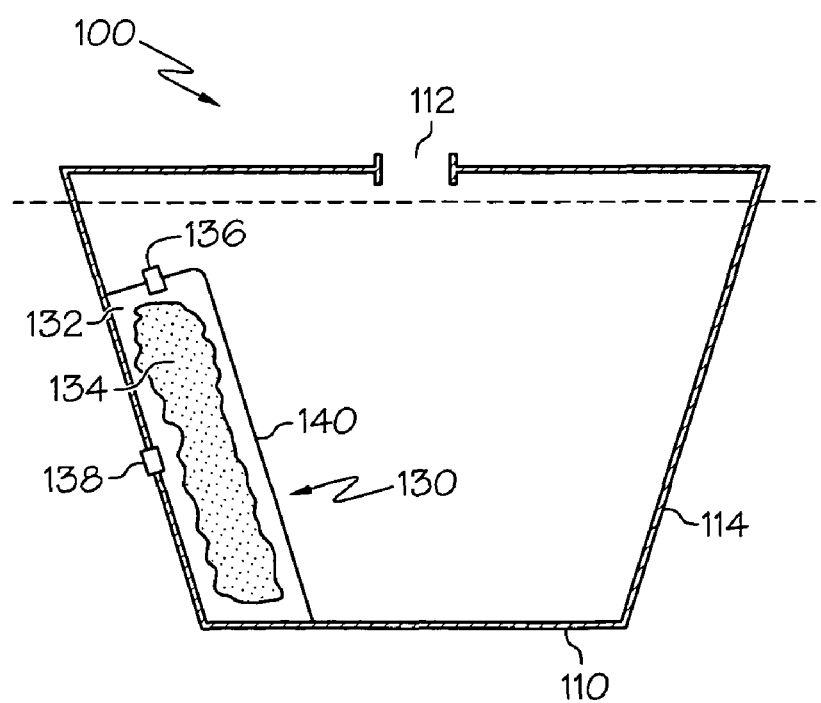
FIG. 3 is a cross-sectional view of the fuel tank of FIG. 2 in a second state.

In the embodiment illustrated in FIGS. 1-3, the variable volume element is shown as a flexible bladder 30, though other embodiments of the element are also possible, as later described. The bladder 30 preferably is coupled to an interior wall of the fuel tank, as shown in FIGS. 1-3, though other positions or arrangements are also possible. Additionally, because the fuel tank 20 as illustrated is embodied as a regular geometric shape, positioning along an interior side wall is easily accomplished. In other embodiments, however, the fuel tank can be embodied in non-regular shapes, including interior features, such as channels, flanges, protrusions or indentations, surface features, conduit or channel openings, as well as certain combinations of regular geometric shapes. Accordingly, the bladder 30 can be disposed coupled to a wall or other interior feature, or along a bottom surface or the underside of an upper surface, as appropriate for the embodiment. In some embodiments, the bladder 30 can conform to the shape of the wall, as desired.

Regardless of location, preferably, the bladder 30 is disposed such that its entire volume would be at or below the fuel fill level within the fuel tank 20. The fuel fill level can be defined as when the fuel in the tank 20 has reached the appropriate level, marking, indicator, guide, or other designation indicating the correct amount of fuel has entered the tank 20 for subsequent operation of the aircraft 1. Thus, the fuel level within the tank 20 is preferably always influenced by the volume of the bladder 30, regardless of the amount of expansion of the bladder 30 or its location within the fuel tank 20. In some embodiments, however, careful calculation regarding volumetric displacement and positioning can allow positioning of the bladder 30 such that at least a portion extends above the fuel level within the tank 20.

Accordingly, when expanded to the upper limit of the variable volume of the bladder 30, the bladder 30 preferably remains at or below the fuel level. Additionally, preferably, no amount of expansion or contraction of volume or positioning of the bladder 30 fails to influence the fuel fill level in the tank prior to the tank reaching its designated capacity. Such a fuel fill level is illustrated by the dashed line through FIGS. 1-3, and its exact location can vary from fuel tank to fuel tank. As can be seen, the bladder 30 is disposed beneath the fill line and does not extend above it.

FIG. 2 illustrates a detailed view of the aircraft 1 with a larger cross-sectional view of the fuel tank 100 in a first state. The fuel port 112 is illustrated at the top of the fuel tank 100, but could be alternately placed as suitable to the embodiment, including offsetting the fuel port 112 from the center of the tank 100. The flexible bladder 130 is shown coupled to a wall of the tank 100. Although shown against the left interior wall, it could also be disposed against another side wall, such as on the top, on the opposite wall 114, or along the bottom 110 of the tank. Preferably, the bladder 130 does not obstruct fuel flow into or out of the fuel tank 100 through any appropriate conduit, channel, port, or other element of fuel transport.

The bladder 130 can comprise, among other features, a flexible membrane 140 having an interior volume 132. The flexible membrane 140 is preferably airtight and/or watertight and/or fueltight and comprised of a material chemically inert to jet fuel. Some commonly-used jet fuels can include JP-8, Jet-A, and the like, as well as diesel, in certain vehicles. Accordingly, suitable materials for the flexible membrane 140 can include metals, such as stainless steel, titanium, and the like, particularly when fashioned as a mesh. Such a mesh can include other elements, such as coatings, linings, and the like of other materials, including certain plastics, rubbers, silicones, or other elastomers. In some embodiments, the flexible membrane 140 can be composed of the plastic, rubber, or other elastomer, or other materials, including coated woven fibers. Some membranes 140 can additionally be at least partially formed of carbon fibers. Preferably, the membrane 140 is flexible enough to respond to pressure differences between the ambient atmosphere and the airtight interior of the bladder 130. The membrane 140 can have sufficient tensile strong so as to withstand differences in pressure between the internal volume and the interior of the fuel tank 100 exceeding one atmosphere, and preferably much higher pressure differences without rupturing or leaking.

The bladder 130 can be filled or inflated with an appropriate fluid, such as an inert gas 134 contained within the membrane 140. The inert gas 134 is preferably chemically non-reactive with the aircraft fuel and the materials comprising the bladder 130. Some inert gases can be nitrogen or a noble gas. Preferably, the membrane 140 can have sufficient integrity to retain the inert gas 134 for long periods without diffusive leaking. Additionally, the properties of the inert gas 134 under varying conditions can be predicted with the ideal gas law with reasonable success. Consequently, the inert gas 134 can fill the interior volume 132 of the bladder 130.

In some embodiments, the interior volume 132 of the bladder 130 can be accessed through a bladder port 136. Preferably, the bladder port 136 can be closed to fluid flow between the interior volume 132 and exterior sources. When engaged or opened, however, the bladder port 136 can permit an operator to remove or introduce fluid to the interior volume 132. Accordingly, an empty bladder 130 can be filled through the bladder port 136, or the amount of inert gas 134 within the membrane 140 can be adjusted. As can be seen, in some embodiments, the bladder port 136 can be accessed from the interior of the fuel tank 100. In other embodiments, a secondary bladder port 138 can also be used. The secondary bladder port 138 preferably can be accessed from outside the fuel tank 100. Certain embodiments of the fuel tank 100 and bladder 130 can comprise one, both, or neither of the ports 136, 138.

Because the flexible membrane 140 can deform in response to pressure differentials, the internal pressure of the inert gas 134 can affect the volume of the bladder. In one example, if the inert gas 134 were pressurized to one atmosphere at sea level, the membrane 140 could have an undeformed shape as shown in FIG. 2.

With reference to FIG. 3, the same tank 100 is shown wherein the ambient atmospheric pressure has been decreased. During open port fueling through the fuel port 112, the atmospheric pressure within the fuel tank 100 can be equalized to that of the pressure surrounding the aircraft 1. In the illustrated embodiment, the bladder 130 is illustrated as being at a higher elevation than the bladder 130 as shown in FIG. 2. Accordingly, because the atmospheric pressure is lower at higher elevations and the flexible membrane 140 prevents release of the inert gas 134, the bladder 130 expands as shown in FIG. 3. The figures provided are illustrative and not to scale.

Thus, as can be seen, the inert gas 134 can expand when the fuel tank 100 is equalized to the surrounding atmosphere of a higher elevation. Consequently, the internal volume 132 of the bladder 130 will expand as the flexible membrane 140 expands outward under pressure from the gas 134. Because the walls of the fuel tank 100 are preferably rigid, the volume available within the fuel tank 100 for fuel is decreased. With precise sizing of the bladder and inflation of inert gas 134 into the bladder, 130, the change in available fuel volume can be calibrated to adequately compensate for engine performance differences and weight profiling in UAVs an other vehicles at different elevations.

Moreover, because open port fueling results in equalization of air pressure inside the fuel tank 100 with the external environment, no further pressurization features, devices, or mechanisms are required. When a specified fuel fill level is designated, a user can fuel an aircraft with open port fueling to its optimal performance profile without specialized equipment or skills. In other embodiments, the variable volume sizing device or element accomplishes these advantageous operations while taking different forms than the bladder 130.

Figure 4:
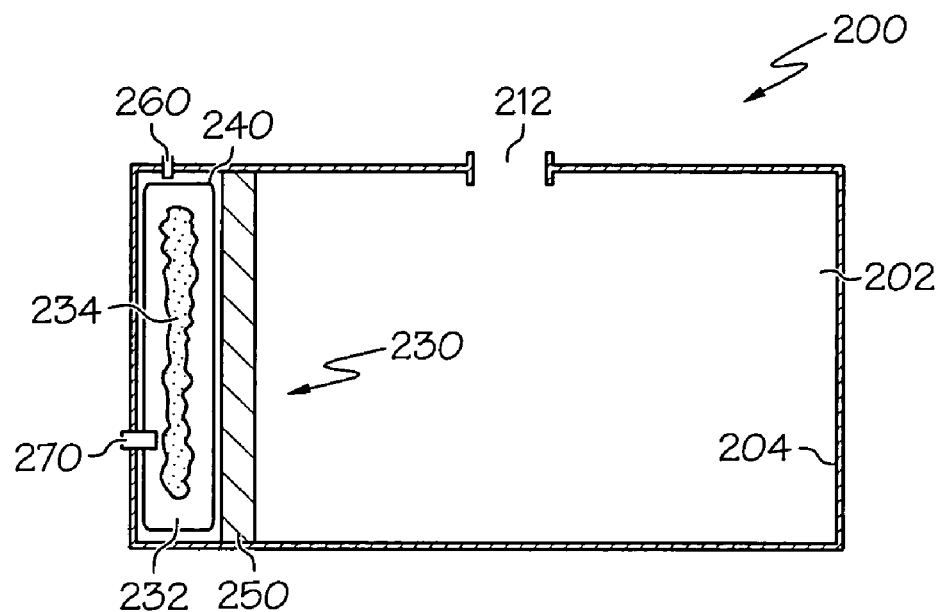
FIG. 4 is a cross-sectional view of another embodiment of a fuel tank in a first state.
Figure 5:
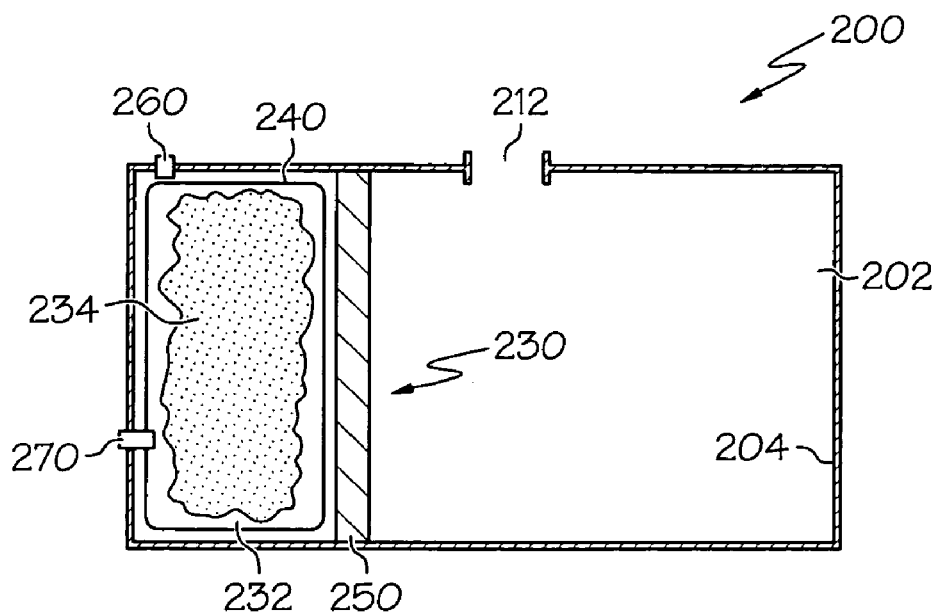
FIG. 5 is a cross-sectional view of the embodiment of FIG. 4 in a second state.

As one example of an alternate embodiment for a variable volume sizing device, FIGS. 4 and 5 illustrate a detailed view of a fuel tank comprising an adjustable or moveable wall 250. FIG. 4 illustrates a fuel tank 200 at sea level, or some lower elevation, while FIG. 5 illustrates the fuel tank 200 at a higher elevation than that of FIG. 4. Although FIG. 4 is described as originating at sea level, other lower altitudes beneath that of FIG. 5 can be used.

The fuel tank 200 can have a fuel port 212 and first chamber or interior 202. The interior 202 can be adapted to contain fuel suitable for use in the aircraft, making the fuel tank a container for fuel. In the embodiments show in FIGS. 4 and 5, the variable-volume sizing element is embodied as a piston assembly 230. The piston assembly 230 can comprise a second chamber or internal volume 232 at least partially filled with an inert gas 234, as described above. In some embodiments, the inert gas 234 can be contained within a flexible membrane 240. Preferably, the membrane 240 is airtight, fueltight, non-reactive to the flexible membrane 240 and adapted to contain the inert gas 234.

In certain embodiments, the membrane can be coupled to an interior, moveable wall 250 which can comprise a boundary of the interior 202 of the tank 200. Accordingly, when filled with fuel, the moveable wall 250 will retain the fuel within the interior 202 and not permit it to pass into the piston assembly 230. The moveable wall 250 can be repositioned relative to an opposite wall 204 at the other end of the tank 200, allowing it to change the volume of the interior 202 available for fuel. Preferably, the position of the moveable wall 250 can be adjusted by changes in the volume of the inert gas 234.

As one example, illustrated in FIG. 5, when the interior 202 is exposed to a low atmospheric pressure through the fuel port 212, wherein the low pressure is relative to the pressure of the inert gas 234 and interior 202 prior to equalization through the fuel port 212, the volume of the inert gas 234 will increase. In those embodiments comprising a flexible membrane 240, the membrane 240 can be coupled to the moveable wall 250. Thus, when the membrane 240 expands, owing to expansion of the inert gas 234, the membrane 240 can exert a push or other force or influence on the moveable wall 250, causing it to change position toward the opposite wall 204 of the fuel tank 200. Accordingly, the volume of the interior 202 available to receive fuel will be decreased.

Conversely when the same position and pressure are later equalized with a pressure at a lower elevation—and higher atmospheric pressure—the inert gas 234 will contract, as illustrated in FIG. 4. As a result, the moveable wall 250 will be repositioned away from the opposite wall 204 of the tank 200. Consequently, the interior 202 of the tank 200 will have a greater volume, and a larger quantity of fuel can be stored therewithin. Accordingly, equalization of atmospheric pressure between the interior 202 and the ambient atmosphere through the fuel port 212 can adjust the volume of the interior 202 of the tank 200, and correspondingly, calibrate the fuel volume stored in the tank 200 based on elevation or other pressure-related condition.

In some embodiments, the moveable wall 250 can seal the interior of the piston assembly 230 from the interior 202 of the tank 200 with an o-ring, or other circumferential or surrounding seal. Such a seal can inhibit fluid communication between the membrane 240 and its associated internal volume 232 and inert gas 234 and the interior 202. In certain embodiments, the membrane 240 can be omitted and the gas 234 can act directly against the moveable wall 250. Preferably, the seal can have a sufficiently low-friction contact with other portions of the tank 200 that the moveable wall 250 is not retarded in its positioning as influenced by the gas 234, either within a membrane 240, or without the membrane 240.

In the example given above, therefore, when the gas 234 expands, in some embodiments, the membrane 240 will press against the moveable wall 250, repositioning it. During contraction of the gas 234 when changing to an ambient atmospheric pressure higher than the gas 234, the moveable wall 250 can move away from the opposite wall 204 either through a coupling or attachment between the membrane 240 and the moveable wall 250 or, where the membrane 240 is omitted, as a result of the pressure differential between the interior 202 and the internal volume 232. Thus, the membrane 240 can be present, and attached to the moveable wall 250, or they can be coupled through physical contact, mutually exerting influence as to the position and/or size and/or shape of the other.

In some embodiments, the fuel tank 200 can comprise an equalization port 260. The equalization port 260 can place the internal portion of the piston assembly 230 in fluid communication with the ambient atmosphere surrounding the tank 200. Thus, for those fuel tanks which are not fueled through open port fueling through a fuel port 212, and instead fuel is provided through a sealed system, component, or element, the equalization port 260 can be opened, permitting normalization of pressure inside the piston assembly 230 with the ambient atmosphere. Preferably the fuel provided through such a system is not pressurized, but rather, the connection simply inhibits pressure equalization through the fuel port 212. Accordingly, air or other gases in the interior of the tank 200 are preferably vented during fueling. Such venting can be to the ambient environment, to another container suitable to receive it, or otherwise transferred as appropriate to the embodiment. The equalization port 260 can be opened prior to fueling to equalize pressure, resulting in proper positioning of the moveable wall 250, and subsequently closed. The equalization port 260 can be used in those embodiments wherein the inert gas 234 is contained within a membrane 240 to avoid permitting escape of the inert gas 234 into the ambient atmosphere where the atmosphere is at a lower pressure than the inside of the piston assembly 230.

In those embodiments where a membrane 240 is used, a separate bladder port 270 can be used to permit fluid communication access to the inert gas 234 through the membrane 240 from outside the fuel tank 200. In those embodiments without a membrane 240, the bladder port 270 can also be used to permit fluid access to the inert gas 234, without the need to additionally communicate through the membrane 240.

Additionally, in those embodiments where a piston assembly 230 is used to embody the variable volume sizing device, the inert gas 234 can be replaced with other gases as suitable to the embodiment. Preferably, however, the gas remains chemically inert to avoid complications arising from unintended introduction of the gas to the interior 202.

Although two embodiments of the variable volume sizing device have been illustrated and described, others are possible and contemplated. According, while at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fuel tank system for an air vehicle, the system comprising:
   a container having an interior adapted to hold fuel, the container comprising a first opening placing the interior in fluid communication with an ambient atmosphere surrounding the air vehicle; and
   a volumetrically-adjustable sizing device adapted to change volume in response to changes in surrounding ambient atmospheric air pressure, the volumetrically-adjustable sizing device disposed within the container and adapted to contain a fluid.

2. The system of claim 1, wherein the fluid is an inert gas.

3. The system of claim 1, wherein the sizing device comprises a flexible bladder.

4. The system of claim 3, wherein the flexible bladder comprises a substance chemically inert to jet fuel.

5. The system of claim 4, wherein the flexible bladder comprises a metal.

6. The system of claim 4, wherein the flexible bladder comprises a coated woven fiber.

7. The system of claim 4, wherein the flexible bladder comprises a plastic.

8. The system of claim 3, wherein the container comprises an interior wall disposed between the flexible bladder and the interior, the flexible bladder coupled to the interior wall.

9. The system of claim 3, wherein the sizing device comprises a port adapted to permit selective communication with the interior of the flexible bladder.

10. A method of adjusting an available volume of an interior of a fuel tank of an air vehicle comprising:
    inserting an airtight, flexible bladder within the interior; and
    equalizing air pressure surrounding the flexible bladder with an ambient atmospheric pressure.

11. The method of claim 10, further comprising inflating an airtight, flexible bladder with an inert gas.

12. The method of claim 11, further comprising adjusting the volume of the inert gas.

13. The method of claim 10, wherein disposing an airtight, flexible bladder within the interior of the fuel tank comprises coupling the flexible bladder to an interior wall of the fuel tank.

14. A fuel tank system comprising:
    a fuel tank having a wall and a first chamber, the first chamber having a first interior and a first volume, and a second chamber having a second interior and a second volume, the wall forming a boundary of the second chamber and configured to adjust the first and second volumes based on its position; and
    a flexible bladder disposed in the second chamber and adjacent to the wall, the flexible bladder having a variable internal volume and configured to contain a fluid and to adjust the position of the wall based on the variable internal volume.

15. The system of claim 14 further comprising a port adapted to place the second chamber in selective fluid communication with the ambient environment.

16. The system of claim 15, wherein the flexible bladder is adapted to respond to changes in ambient air pressure by adjusting its internal volume.

17. The system of claim 16, wherein the flexible bladder is coupled to the wall and adapted to adjust the position of the wall based on its internal volume.

18. The system of claim 14, wherein the fuel tank further comprises a fuel port adapted to permit fluid communication with the first interior.

19. The system of claim 18, wherein the first and second chambers are not in fluid communication.

20. The system of claim 14, wherein the flexible bladder further comprises a bladder port adapted to permit selective fluid communication with the internal volume of the bladder.

* * * * *